United States Patent [19]

Tischer

[11] 4,359,866
[45] Nov. 23, 1982

[54] ROTATABLE CONTROLLER SYSTEM

[75] Inventor: Werner Tischer, Bobingen, Fed. Rep. of Germany

[73] Assignee: Zahnradfabrik Friedrichshafen, AG, Friedrichshafen, Fed. Rep. of Germany

[21] Appl. No.: 136,740

[22] Filed: Apr. 2, 1980

[30] Foreign Application Priority Data

Apr. 28, 1979 [DE] Fed. Rep. of Germany ....... 2917435

[51] Int. Cl.³ ............................................. F15B 13/04
[52] U.S. Cl. ................................. 60/384; 137/625.68; 418/61 B
[58] Field of Search .......................... 60/384; 180/132; 137/625.68, 625.69; 418/61 B

[56] References Cited

U.S. PATENT DOCUMENTS

| 21,682 | 10/1858 | Jobin | 137/625.68 |
| 149,019 | 3/1874 | Witty | 137/625.68 |
| 3,862,645 | 1/1975 | Bianutetta et al. | 137/625.3 |
| 3,937,601 | 2/1976 | Miller | 418/61 B |

Primary Examiner—Gerald A. Michalsky
Attorney, Agent, or Firm—Zalkind & Shuster

[57] ABSTRACT

Axially spaced and aligned longitudinal distributor grooves are formed in the radially outer surface of a thin-walled tubular valve element in angularly spaced relation to internal grooving of the valve element for conducting pressurized fluid and establishing a torsional coupling in a hydrostatic controller associated with a power steering system. Obliquely orientated bores in the valve housing establish fluid communication between the longitudinal grooves adjacent opposite axial ends of the housing and axial passages in the housing.

15 Claims, 3 Drawing Figures

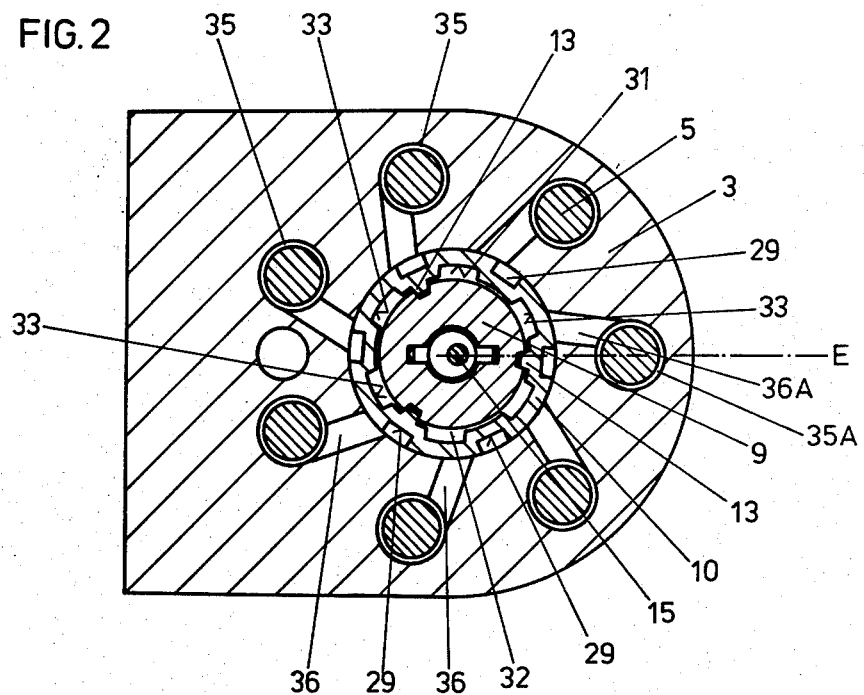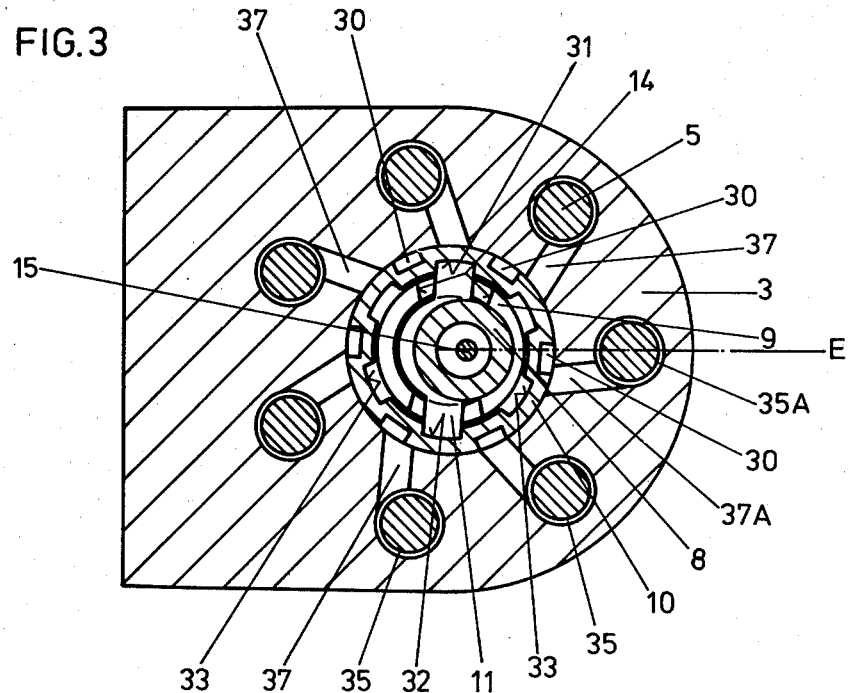

ROTATABLE CONTROLLER SYSTEM

BACKGROUND OF THE INVENTION

This invention relates to a hydrostatic controller for a vehicle power steering system of the type including a metering device having a rotor coupled to the steering drive shaft through which limited axial displacement is imparted to a rotatable valve element controlling the flow of fluid through the metering device to a servomotor and is related disclosure-wise to the subject matter in copending application Ser. Nos. 136,471, 147,583 and 147,601, respectively filed Apr. 2, 1980 and May 7, 1980, and owned in common by the same assignee.

The arrangement of longitudinal distributor grooves on the rotatable valve element associated with the foregoing type to hydrostatic controller, makes possible precision controlled distribution of pressure medium with minimal leakage losses from the fluid displacing pockets of the metering device and the pressure chambers of the servomotor. Such arrangements are disclosed, for example, in German Pat. No. 14 80 720 and in U.S. Pat. No. 3,937,601. In such prior art arrangements, the rotatable valve element is necessarily provided with a relatively thick wall since internal grooves are formed therein for coupling of the rotor gear of the metering device to the valve element through its internal bore in the region of the longitudinal distributor grooves aforementioned.

It is therefore an important object of the present invention to provide a rotatable controller of the aforementioned type having a compact construction and which may be fabricated at a reduced cost in a simpler fashion than was heretofore thought possible.

SUMMARY OF THE INVENTION

In accordance with the present invention, a thin-walled rotatable control valve element for a hydrostatic vehicle steering system controls flow along flow paths established by distributor grooves formed adjacent opposite axial ends thereof on its radially outer surface, such grooves being in fluid communication with axial passages in the valve housing by means of obliquely orientated connecting bores disposed at an angle to radial planes intersecting the axes of the axial passages and the internal valve bore of the housing from which the connecting bores extend. The distributor grooves at opposite ends of the valve element are substantially aligned in an axial direction and angularly spaced from internal grooves formed in the radially inner surface of the valve element to establish spline connections and fluid conducting passages flow paths.

As a result of the axial alignment of the external distributor grooves aforementioned, and their angular spacing from the internal grooving of the rotatable valve element, the reduction in cross-sectional area of the valve element is such as to still enable use of a relatively thin-walled valve element. Also, formation of the aforementioned connecting bores in the valve element is facilitated because of the relatively thin wall of the valve element and the oblique orientation of the connecting bores. The internal grooving aforementioned for the valve element may also be made continuous to thereby facilitate evacuation.

BRIEF DESCRIPTION OF DRAWING FIGURES

Other objectives of the invention and additional advantageous features will become apparent from the description set forth hereinafter in more detail on the basis of a specific embodiment as shown in the accompanying drawings, wherein:

FIG. 2 is a transverse section view taken substantially through a plane indicated by Section line II—II in FIG. 1.

FIG. 3 is a transverse section view taken substantially through a plane indicated by Section line III—III in FIG. 1.

DETAILED DESCRIPTION OF PREFERRED EMBODIMENT

Figure 1:
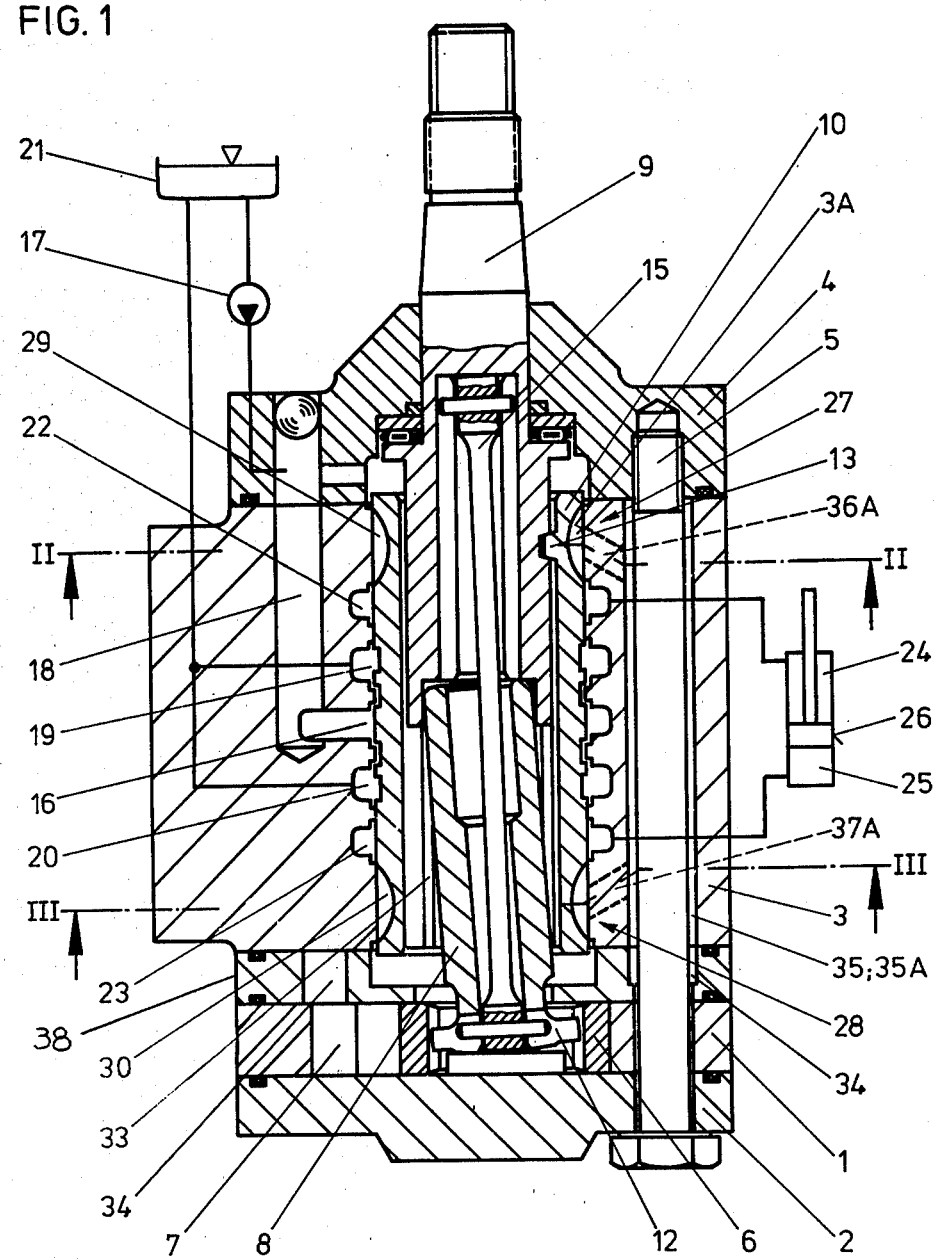
FIG. 1 is a longitudinal side section view through a hydrostatic controller associated with a power steering system illustrated schematically.

Referring now to the drawings in detail, FIG. 1 illustrates a hydrostatic controller adapted for use with a hydrostatic steering system for a motor vehicle. The controller includes at one axial end a fluid metering pump device having an internally toothed stator gear 1 disposed between an end cover 2 and an axial spacer 38. The end cover, stator gear and spacer are interconnected with and held assembled on one axial end of a tubular valve housing 3 by screw fasteners 5 which extend through axial bores 35. Also connected to the housing 3 at the opposite axial end by means of the fasteners 5, in a cover 4. The fluid metering device also includes an externally toothed rotor gear 6 in mesh with and having one tooth less than the toothed stator gear 1. Expanding and contracting fluid displacing pockets 7 are formed between the teeth of the gears 1 and 6 and between the confronting surfaces of the cover 2 and the end of the housing 3 adjacent the gear 6.

The housing 3 is formed with an internal valve bore 3A rotatably mounting a rotatable slide valve element 10 of tubular construction in coaxial relation to a drive shaft 9 extending axially from the cover 4. The valve element 10 is torsionally connected to the rotor gear 6 for control of the metering pump device by a hinge coupling in the form of a universal joint shaft 8. Two driving pins 11 and 12 as respectively shown in FIGS. 3 and 1, establish a jointed connection between gear 6, universal joint shaft 8 and valve element 10. The valve element is axially shiftable relative to the drive shaft 9 in response to relative angular movement by virtue of a coarse-pitched threaded connection 13 to control flow to and from a servomotor 26. Relative angular displacement between the drive shaft 9 and valve element 10 causing axial displacement of the valve element is limited by stops 14 as shown in FIG. 3. A torsion spring rod 15, pinned at opposite longitudinal ends to the drive shaft 9 and the universal joint shaft 8 as shown in FIG. 1, centers the valve element 10.

The housing 3 and the valve element 10 interact to regulate the pressure and distribution of a pressurized medium. A center inlet port 16 formed in the housing is connected to a servomotor pump 17 associated with the hydrostatic steering system from which the pressurized medium is received. The pressurized medium is thereby supplied to the interior of the valve element 10 by a supply passage 18 interconnected between the pump 17 and the inlet port 16. Two fluid return ports 19 and 20 spaced adjacent to the inlet port 16 are connected to a reservoir tank 21 for the pressure medium. One of two annular outlet ports 22 and 23 spaced adjacent to the return ports 19 and 20, is connected with one of two pressure chambers 24 and 25 of the servomotor 26 associated with the hydrostatic steering system. Annular grooves are formed externally in the radially outer surface of valve element 10 in a well known manner so that in a neutral position of the valve element an almost pressureless circulation of the pressure medium occurs between the servo pump 17 and the reservoir tank 21, while in an axially shifted steering position of the valve element 10, such free circulation is blocked and one of the two outlet ports 22 and 23 is in fluid communication with one of the two return ports 19 and 20. The valve element 10 thus functions through the flow paths of its flow passage systems to control the flow of pressure medium from pump 17 through the metering device to the servomotor 26 for power steering purposes in a manner generally well known in the art.

The flow passage systems 27 and 28 respectively including longitudinal distributor grooves 29 and 30 are formed externally in the radially outer surface of valve element 10 at the opposite axial ends thereof. The longitudinal distributor grooves are limited axially in both axial directions and form valve edges which cooperate with housing grooves adjacent thereto. The longitudinal distributor grooves 29 and 30 are angularly aligned with each other either precisely or within narrow tolerances. Where precise alignment exists, each of the grooves at the ends of the valve element 10 are produced by two milling cutters moved jointly along parallel axes in one operational stroke. As a result, a significant reduction in machining operations is achieved in the fabrication of the valve element as compared to rotatable controller valves hereto manufactured with spaced longitudinal distributor grooves. The main advantage, however, of the aligned or almost aligned longitudinal distributor grooves 29 and 30, resides in accommodating internal grooving on the radially inner surface of the valve element 10 despite its relatively thin wall by location of the grooving angularly spaced from the grooves 29 and 30. Such internal grooving includes continuous longitudinal grooves 31 and 32 necessary for reception of the drive pin 11 and continuous fluid passage grooves 33 for conducting the pressure medium from the supply passage 18 to the longitudinal distributor grooves. An angular tolerance of 10°, for example, limits non-alignment of grooves 31, 32 and 33 with the longitudinal distributor grooves 29 and 30 because of minimum wall thickness requirements of the valve element 10 and a minimum width for the grooves 33 sufficient to accommodate passage therethrough of fluid with little leakage losses.

Both longitudinal distributor grooves 29 and 30 are blocked in the neutral position of the valve element 10. In the steering positions of the valve element, the longitudinal grooves 29 are in fluid communication with the supply passage 18, or the servomotor outlet port 22 depending on the direction of steering, while the longitudinal distributor grooves 30 are in fluid communication with the outlet port 23 or the supply passage 18. Fluid communication between the expanding and contracting pockets 7 in the metering device and the longitudinal distributor grooves 29 and 30 is established by passages 34 in the spacer 38, axial passages 35 in the housing through which the fasteners 5 extend and two systems of connecting passages 36 and 37. The formation of the passages 34 and axial passages 35 is already known as disclosed in German Pat. No. OS 2,718,148 so that no detailed description thereof is set forth herein. The number of axial passages 35 corresponds to the number of gaps between the teeth of the stator gear 1 with which the pockets communicate. The connecting passages 36 and 37 are formed as bores extending from the axial passages 35 to the internal bore 3A of the housing. Two of the connecting passages, bores 36A and 37A, for example, extend from one axial bore 35A. One of the bores 36A extends to one of the longitudinal distributor grooves 29 of system 27 while the other of the bores 37A extends to one of the longitudinal distributor grooves 30 of system 28. The terminal ends of the bores 36A and 37A at the internal bore 3A of the housing, are angularly spaced from each other since the axial passage 35A is in continuous fluid communication only with one of the longitudinal grooves of the system 27 or 28. For this reason, the bores 36A and 37A as shown in FIGS. 2 and 3, are disposed obliquely relative to each other and obliquely relative to a radial plane E extending through the axes of the valve element 10 and the axial passage 35A. Alternatively, the bores 36A and 37A may be disposed parallel to each other and spaced from the plane E, or diverge from each other at different angles to the plane E.

The connecting passages 36 and 37 may be produced advantageously as oblique extending bores utilizing drills inserted at the axial ends of the housing 3 through the internal surfaces of the bore 3A, toward an axial passage 35, to thereby diverge from a plane perpendicular to the axes of the valve element 10.

What is claimed is:

1. A power steering system, including a metering pump device having an internally toothed stator gear (1) and an externally toothed rotor gear (6) in mesh with said stator gear, a valve housing (3) fixed to the stator gear having a bore (3A) formed therein, a servomotor (26), a drive shaft (9), a hinge coupling (8) connecting the drive shaft to the rotor gear, a rotatable valve element (10) means mounting the valve element for axial displacement within said bore of the housing to control flow to and from said servomotor, drive pin means (11) coupling the valve element to the hinge coupling for rotation of the rotor gear in response to rotation of the valve element to control the metering pump device, said valve element having two systems (27 and 28) of axially limited, longitudinal distributor grooves (29 and 30) formed externally thereon, said housing further having a supply passage (18), two outlet ports (22, 23) connected to the servomotor and axial passages (35) formed therein, said distributor grooves of the respective systems being substantially aligned with each other in an axial direction within predetermined limits, and connecting passages (36, 37), formed in the housing establishing fluid communication between the distributor grooves at the bore and the axial passages.

2. The controller as defined in claim 1 wherein the two systems of longitudinal distributing grooves are formed at opposite axial ends of the valve element.

3. The controller as defined in claim 1 wherein the valve element is formed internally with continuous passage means (33) for conducting a pressure medium between the supply passage and the longitudinal distributor grooves.

4. The controller as defined in claim 3, wherein the longitudinal distributor grooves are angularly spaced from the continuous passage means.

5. The controller as defined in claim 1, wherein said connecting passages are formed as bores extending from the axial passages at an angle to radial planes (E) intersecting the valve element and the axial passages.

6. The controller as defined in claim 1, wherein the control passages diverge from a plane perpendicular to the valve element.

7. The controller as defined in claim 1 wherein the longitudinal distributor grooves of the two systems are precisely aligned in an axial direction.

8. In a fluid power operated system having a source of pressurized medium (17), a servomotor (26) and a fluid metering device (1–6) through which the pressurized medium is conducted to the servomotor, a controller comprising a housing (3) formed with a bore (3A), an axial passage (35) and inlet and outlet ports (16, 22, 23) in fluid communication with said bore, a tubular valve element (10), means operatively mounting said valve element in said bore for axial and angular displacements respectively controlling flow of the pressurized medium and operation of the fluid metering device, said valve element having radially outer and inner surfaces extending between opposite axial ends thereof and passage means through which said pressurized medium is conducted from the source, including axially aligned grooves (29 and 30) formed in the outer surface of the valve element adjacent said opposite ends, and connecting bores (36 and 37) extending through the housing between said axial passage and the grooves.

9. In a controller as defined in claim 8 wherein said connecting bores extend at an angle to a plane perpendicular to the valve element.

10. In a controller as defined in claim 9 wherein said connecting bores extend at an angle to a radial plane (E) intersecting the valve element and the axial passage.

11. In a controller as defined in claim 10 wherein said valve element is formed with internal grooving (31, 33) in the inner surface angularly spaced from the axially aligned grooves.

12. In a controller as defined in claim 8 wherein said valve element is formed with internal grooving (31, 33) in the inner surface angularly spaced from the axially aligned grooves.

13. In a controller as defined in claim 8 wherein said connecting bores extend at an angle to a radial plane (E) intersecting the valve element and the axial passage.

14. In a fluid power steering system having a source of pressurized fluid (17), a servomotor (26), a steering drive shaft (9), a fluid metering device including a rotor gear (6), and controller means driven by the drive shaft for controlling flow of the fluid along flow paths between said source and the servomotor through the metering device and operation of the metering device including a valve housing (3), a tubular valve element (10), and means operatively connecting the drive shaft to the valve element and the rotor gear for axial and angular displacements of the valve element to respectively control said flow of the fluid and said operation of the metering device, the improvement residing in internal groove means (31, 32, 33) formed internally of the tubular valve element for establishing a torsional coupling between the valve element and the rotor gear and form flow passages conducting said fluid along said flow paths and distributor groove means (29, 30) formed externally in the valve element in angularly spaced relation to the internal groove means for establishing said flow paths, whereby the flow paths and the torsional coupling are formed in the tubular valve element having a reduced radial thickness.

15. The improvement as defined in claim 14 wherein the distributor groove means comprises separate longitudinal groove segments formed adjacent opposite axial ends of the valve element in substantial angular alignment, said internal groove means including continuous grooves extending axially between the separate groove segments.

* * * * *